United States Patent [19]

Wexler et al.

[11] 4,024,217
[45] May 17, 1977

[54] METHOD OF ISOTOPE SEPARATION BY CHEMI-IONIZATION

[75] Inventors: Sol Wexler, Downers Grove; Charles E. Young, Westmont, both of Ill.

[73] Assignee: The United States of America as represented by the United States Energy Research and Development Administration, Washington, D.C.

[22] Filed: May 23, 1975

[21] Appl. No.: 580,499

[52] U.S. Cl. .......................... 423/19; 204/157.1 R; 204/DIG. 11; 250/284; 250/288; 250/423 P; 250/424; 423/251; 423/258
[51] Int. Cl.² .................. B01D 59/44; C01G 43/06
[58] Field of Search ................ 204/157.1, DIG. 11; 250/283, 284, 423 P, 288, 292, 424, 425; 423/19, 251, 258

[56] References Cited

UNITED STATES PATENTS

| | | | |
|---|---|---|---|
| 2,836,750 | 5/1958 | Weimer | 250/288 X |
| 2,938,116 | 5/1960 | Senson | 250/287 |
| 2,950,389 | 8/1960 | Paul et al. | 250/284 |
| 3,577,026 | 5/1971 | Haeberli | 250/424 |
| 3,616,596 | 11/1971 | Campargue | 55/17 |
| 3,679,897 | 7/1972 | Hanson et al. | 250/251 |
| 3,845,300 | 10/1974 | Roehling et al. | 250/294 X |

*Primary Examiner*—Edward A. Miller
*Attorney, Agent, or Firm*—Dean E. Carlson; Arthur A. Churm; James W. Weinberger

[57] ABSTRACT

A method for separating specific isotopes present in an isotopic mixture by aerodynamically accelerating a gaseous compound to form a jet of molecules, and passing the jet through a stream of electron donor atoms whereby an electron transfer takes place, thus forming negative ions of the molecules. The molecular ions are then passed through a radiofrequency quadrupole mass filter to separate the specific isotopes. This method may be used for any compounds having a sufficiently high electron affinity to permit negative ion formation, and is especially useful for the separation of plutonium and uranium isotopes.

10 Claims, 1 Drawing Figure

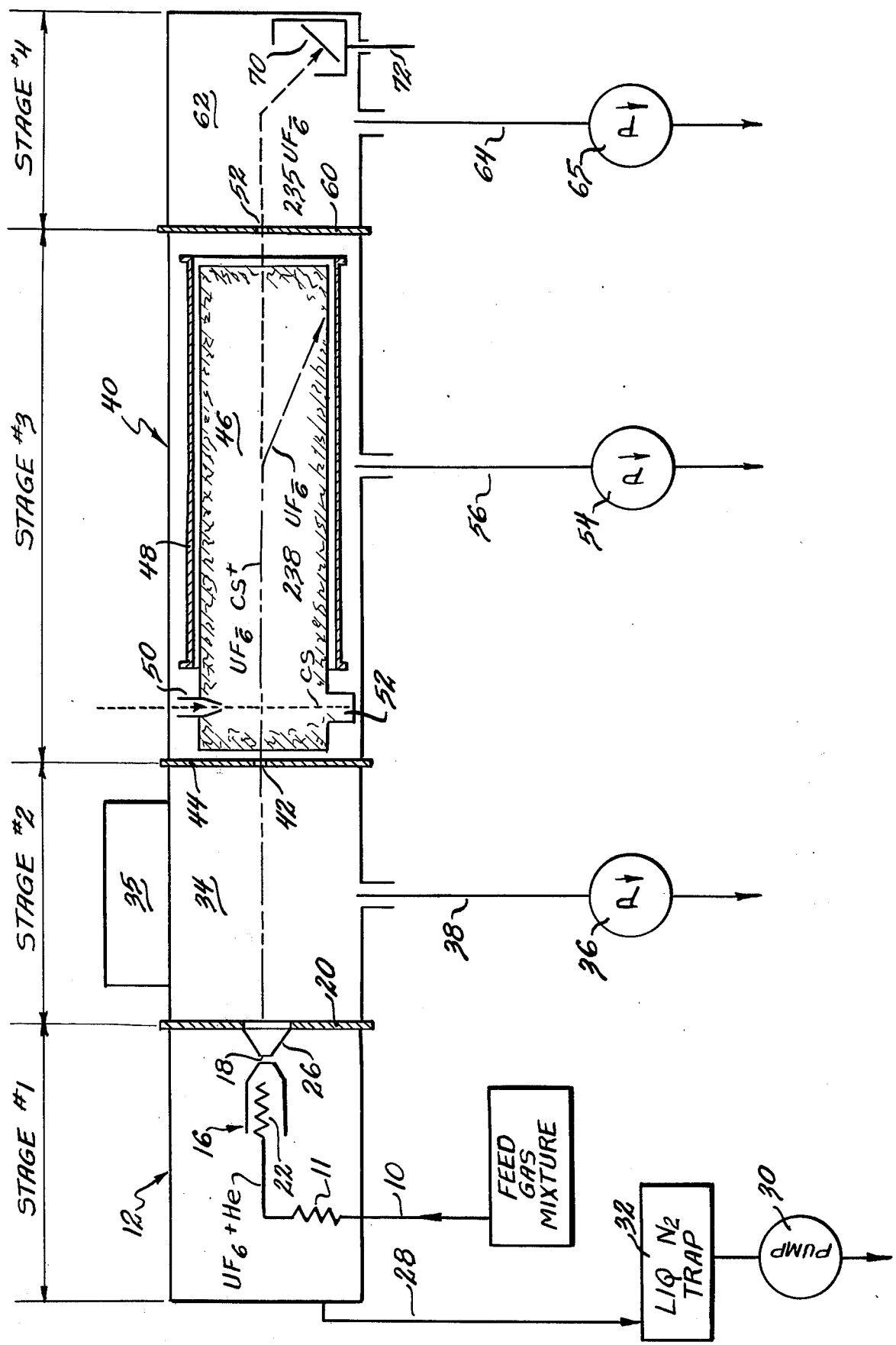

METHOD OF ISOTOPE SEPARATION BY CHEMI-IONIZATION

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to a method for the separation of isotopes from isotopic mixtures. More specifically, this invention relates to a method for the separation and recovery of isotopes of actinide elements. Still more specifically, this invention relates to a method for the separation and recovery of isotopes of uranium and plutonium.

While the demand for energy continues to increase, the supply of fossil fuels to supply this energy continues to grow smaller. This situation has placed increased emphasis on developing alternative sources of energy. Nuclear-fueled power reactors provide at least one means for partially solving the energy crisis and preventing it from becoming chronic. However, additional power reactors both here and abroad will require the production of large quantities of fuel to supply them. Since most of these reactors will be fueled with uranium, additional facilities will be required in the future for uranium enrichment. Uranium comes in two isotopes, the common nonfissioning uranium-238 and fissioning uranium-235. To be useful in a reactor, a fuel must be provided that is "enriched" in uranium-235 to at least 3% rather than the 0.7% found in naturally occurring uranium.

To make this enrichment, it is necessary that the two isotopes be separated. Separation of the isotopes cannot be done by ordinary chemical methods, since the chemical properties of each are exactly the same. Instead, methods must be used which are based on differences in mass. A number of separation methods have been developed such as the gas centrifuge process, electromagnetic separation and thermal diffusion, which have either not been carried beyond the pilot-plant stage or have been used only for an interim period of time. Uranium enrichment is presently being carried out utilizing the gaseous diffusion process. However, because the present facilities are becoming inadequate and because gaseous diffusion requires an enormous capital investment and consumes large quantities of electrical power to carry out the separation process, a considerable effort is being made to develop new methods for enrichment.

SUMMARY OF THE INVENTION

A method for isotopic separation has been invented which is based upon the principle of chemical ionization or chemi-ionization. By this method for separating a specific isotope from a mixture of isotopes of an actinide element present as $MF_6$, where M is the actinide element, a feed gas mixture of $MF_6$ in a propellant gas is prepared, and passed under pressure through an expansion nozzle where the feed gas is heated to about 600° C., and released into an exhaust chamber having a reduced pressure to form a jet of $MF_6$ molecules, $MF_6$ molecular clusters and propellant gas, the $MF_6$ molecules having an energy of about 3 eV. The $MF_6$ molecules are converted to negatively charged molecular ions by passing the jet through a cross jet of electron donor atoms so that an electron transfer takes place between the $MF_6$ molecules and the electron donor atoms, whereby the jet is now quasi-neutral, containing negative $MF_6$ ions and positive donor ions. The quasi-neutral jet is then passed through a radiofrequency mass filter tuned to separate $MF_6$ ions containing the specific isotope from the $MF_6^-$ ions of the other isotopes present in the mixture. The $MF_6^-$ ions of the specific isotope are then neutralized and collected.

The method of the invention is useful for the separation of isotopes of elements which can form molecules having electron affinities high enough so that the molecules can be converted to negative ions by chemi-ionization. The method is particularly applicable to the hexafluoride compounds of heavy metals such as tantalum, titanium, platinum and tungsten, and most particularly applicable to the actinide hexafluoride compounds such as $UF_6$ and $PuF_6$. Thus, while the method of the invention is hereinafter generally described in terms relating to the separation of uranium isotopes, the invention is equally applicable to the separation of plutonium isotopes.

The process of this invention has several advantages over processes presently employed or being investigated for the enrichment of uranium. Since the process employs a single passthrough rather than a cascade process or multiple passthrough as in the gaseous diffusion process, it can be used with isotope mixtures of any composition. Thus, for example, the process can be useful for the recovery of $^{235}U$ in the $^{238}UF_6$ tailings of presently operating gaseous diffusion plants. The process can be easily and readily scaled up to any number of units, and can be scaled up for use as a commercial enrichment or separation process simply by adding the required number of additional units. The process can be used to provide any desired isotopic enrichment, since it can recover the desired isotope in a very high state of purity. The pure isotope can then be added to the naturally occurring isotopic mixture to achieve the required degree of enrichment. The process can also be used to separate any specific isotope from a mixture of isotopes. Thus, for example, it could be used to separate $^{233}U$ from $^{232}U$ which have been produced from thorium.

Most importantly, it has been projected that the capital and operating costs of a separations facility using the process of this invention will be only a fraction of the capital and operating costs of a new gaseous diffusion plant having the same capacity. Of great importance is that the better part of the savings in operating cost is due to greatly reduced requirements for power (electricity), already in short supply in parts of the country.

It is therefore one object of this invention to provide an improved method for the separation isotopes.

It is another object of this invention to provide a method for the separation of a specific isotope from a mixture of isotopes of an actinide element.

A further object of the invention is to provide a method for separating a specific isotope from a mixture of isotopes of uranium or plutonium.

It is still a further object of the invention to provide a process for separating a specific isotope of uranium from a mixture of isotopes of uranium which can be easily scaled up to a size for commercial operation.

It is still another object of the invention to provide a process for the separation of a specific isotope of uranium from a mixture of isotopes of uranium that is substantially less expensive in capital and operating costs than present methods for uranium enrichment.

It is still a further object of the invention to provide a process for the separation of $^{235}U$ from an isotopic mixture of uranium in which essentially pure $^{235}U$ can be recovered and which can be used to achieve any desired degree of uranium enrichment.

Finally, it is the object of the invention to provide a process by which $^{235}U$ can be recovered from isotopic mixtures of uranium containing low concentrations of $^{235}U$ which are not presently recoverable.

BRIEF DESCRIPTION OF THE DRAWING

The drawing is a longitudinal section of the apparatus used to practice the method of the invention.

PREFERRED EMBODIMENT OF THE INVENTION

These and other objects of the invention for separating a specific isotope from a mixture of isotopes of uranium present as $UF_6$ may be met by preparing a feed gas mixture of about 5% $UF_6$ and about ½% $SF_6$ as a heat transfer gas in a helium propellant, maintaining the feed mixture at least 60° C. and passing the mixture at a pressure of from about 1 to about 25 atmospheres through an expansion nozzle where the gas is heated to about 600° C. and releasing the heated gas into an exhaust chamber which is maintained at a pressure of about 0.1 to 1.0 Torr, whereby a gas jet of $UF_6$ molecules, $UF_6$ molecular clusters, $SF_6$ molecules and propellant gas is formed, the $UF_6$ molecules having an energy of about 3 eV, vaporizing the $UF_6$ molecular clusters in the jet, thereby forming mono-molecular $UF_6$ species, converting the $UF_6$ molecules to $UF_6^-$ ions by passing the jet through a cross jet of cesium electron donor atoms so that electron transfer takes place between the $UF_6$ molecules and the cesium atoms, whereby the jet is now quasi-neutral, containing $UF_6^-$ and $Cs^+$ ions, passing the quasi-neutral jet through a radio frequency mass filter tuned to permit the $UF_6^-$ ions of the specific isotope to pass through the filter while ejecting $UF_6^-$ ions of the other isotopes present, and neutralizing and collecting the $UF_6^-$ ions of the specific isotope.

While the process of the invention is described in detail as it relates to the separation of uranium isotopes from an isotopic mixture of uranium present as uranium hexafluoride, the process is equally applicable to the separation of other actinide isotopes from isotopic mixtures of actinides present as actinide hexafluoride compounds, and most particularly to the separation of plutonium isotopes from isotopic mixtures of plutonium present as plutonium hexafluoride.

The propellant in the feed gas aerodynamically accelerates the $UF_6$ by velocity equilibration. The propellant must be a very light gas that is unreactive with either $UF_6$ or the heat transfer gas if present. Either helium or hydrogen may be used as propellants, although helium is preferred because hydrogen may react with $UF_6$ at higher temperatures and because of inherent dangers in the presence of hydrogen. The feed gas may contain from about 1 to about 10 mole % of $UF_6$ while about 4 to 6% is preferred and about 5% is most preferred.

It is preferable that the feed gas mixture contain a heat transfer gas. It is probable that during expansion of the gas mixture from the nozzle many clusters of $UF_6$ molecules will be formed in addition to single or monomolecules of $UF_6$. Since these clustered molecules cannot be used for isotope separation, it is important that the clusters be broken up or vaporized. Thus the addition of a heat transfer gas to the feed gas mixture to vaporize the $UF_6$ clusters is important. The heat transfer gas acts to absorb energy from an external source of irradiation and impart or transfer this energy in the form of heat to vaporize the $UF_6$ molecular clusters to mono-molecules which can be used for the separation process. Thus the feed gas mixture may contain one of several compounds as a heat transfer gas, such as about ½ to 5 mole % $SF_6$ or HF. The methods useful for irradiating the heat transfer will be described later.

The feed gas may be prepared by forcing the propellant gas at up to 25 atmospheres pressure through small holes in a nickel tube immersed in a container of liquid uranium hexafluoride maintained at about 100° C. by a surrounding bath. The pressure of the propellant gas, its flow rate, and the temperature of the uranium hexafluoride are adjusted so that the feed gas mixture contains from about 1 to 10% uranium hexafluoride. The heat transfer gas may be introduced into the feed gas mixture through a leak valve, adjusted so that the feed mixture will contain the proper amount. It is important that the final feed gas mixture be maintained at a temperature of at least 60° C., and preferably about 100° C., to maintain the $UF_6$ in the gaseous state.

The $UF_6$ is accelerated by passing the feed gas mixture at a pressure from about 1 to 25 atmospheres, and preferably at about 15 atmospheres, through an expansion nozzle where the feed gas is heated to a temperature of about 600° C. before being released and expanded into an exhaust chamber which is at a pressure of about 0.1 to 1.0 Torr. Velocity equilibration between the $UF_6$ molecules and propellant gas during the expansion results in the $UF_6$ attaining a translational energy of about 3 eV. The pressures and temperatures in the nozzle are important to ensure that a sufficiently intense jet of $UF_6$ molecules is formed so that an adequate quantity of the specific isotope of uranium can be recovered.

As the heated and pressurized feed gas is released through the expansion nozzle into the vaporization chamber, only a relatively small amount of the total feed gas, about 1%, goes to form the gas jet. The remaining 99% of the feed gas mixture is separated from the jet, the component gases are separated, recovered and recycled to prepare additional feed gas.

The gas jet, which is now in excess of about 50% $UF_6$, is passed into a second, irradiation chamber, where the jet is preferably irradiated to vaporize the molecular clusters, which may contain up to $10^4$ molecules, to single molecules. This mono-molecular formation may take place by several methods, depending upon the heat transfer gas. For example, if $SF_6$ is present, a 3 to 10 watt $CO_2$ laser, operated in a multi-pass, intra-cavity mode, will heat the clusters as a result of absorption of irradiation near 10.6 $\mu$ by the $SF_6$ molecules. Vibrational-rotational relaxation of the excited $SF_6$ followed by a rapid heat transfer will evaporate all the molecular clusters to form mono-molecular $UF_6$ species. A $UF_6$ flux of $1.4 \times 10^{19}$ molecules $sec^{-1}$ will require the absorption of about 1.2 watts of radiation for complete evaporation. If HF is used as the heat transfer gas, either a hydrogen fluoride laser emitting radiation near 2 $\mu$ or microwave radiation can be used to excite the molecules. In the latter method, an electrical field strength of about 10 kV/cm will be required to vaporize the $UF_6$–HF clusters completely. Thus at a frequency near $3 \times 10^{10}$ Hz a tuned microwave cavity about 14 cm in length will require about 150 watts of power. A third method for cluster vaporization is ablation, which eliminates the necessity of adding a heat transfer gas to the feed mixture. By this method, the gas jet containing $UF_6$ molecular clusters is passed through a collision cell, several centimeters in length, containing $UF_6$ gas at $10^{-4}$ to $10^{-3}$ Torr pressure. Collisions between the fast clusters and the thermal $UF_6$ molecules will convert a large fraction of the clusters to mono-molecular $UF_6$ species.

The jet containing mono-molecular $UF_6$ is passed into a quadrupole chamber which is at a pressure of $\sim 10^{-4}$ Torr, where it passes at right angles through a cross jet of electron donor atoms during which ionization takes place by converting the neutral species to ion pairs by electron transfer. The area of the cross jet through which the $UF_6$ jet passes and the density of metal atoms in the jet will depend upon the cross section of the electron transfer process. Since the cross section for the Cs-$UF_6$ system is $> 150 \times 10^{-16}$ cm$^2$, it is estimated that greater than about 90% of the $UF_6$ is converted to $UF_6^-$ ions on passing through a cross jet of cesium atoms extending about 2 cm along the $UF_6$ beam, and having a density of about $10^{13}$ to $10^{14}$ atoms cm$^{-3}$. The cross jet of electron donor metal atoms is formed from atoms coming from a heated nozzle-oven assembly. The kinematics of the collision process result in the ion pair moving in the same direction as the gas jet. The high density of ion pairs ($10^{13}-10^{14}$ cm$^{-3}$) will facilitate the formation of a quasi-neutral plasma of $UF_6^-$ ions and positive electron donor ions, whose over-all charge neutrality during the time of passage through the quadrupole will effectively suppress space-charge blow-up of the $UF_6^-$ ion beam, and consequently allow greater throughputs of enriched $UF_6$ than obtainable in space-charge limited beams.

The electron donor atoms may be atoms of any metal which will readily donate or lose an electron in collision with a molecule of $UF_6$ at a reasonable kinetic energy. Cesium is preferred, having a high cross section with $UF_6$ molecules at 3 eV. Other metals which may also act as electron donors are sodium, potassium, barium, thallium and bismuth.

The quasi-neutral jet passes through a radiofrequency mass filter which is tuned to separate the $UF_6^-$ ions containing the specific isotope from the $UF_6^-$ ions containing the other isotopes. While the mass filter may be tuned to eject any ionized uranium isotopes, it is preferred that the $UF_6^-$ ions containing the specific isotope be passed through the filter while rejecting the $UF_6^-$ ions containing the other isotopes, since this method permits recovery of a specific isotope having the highest degree of purity. Thus, for example, the mass filter can be tuned to eject $^{238}UF_6^-$ ions while passing $^{235}UF_6^-$ ions, or it can be tuned to pass $^{239}PuF_6^-$ ions while ejecting $^{240}PuF_6^-$ ions. Methods for tuning radiofrequency mass filters are well known to those skilled in the art and are not discussed in detail herein. The ionized molecules which are not ejected by the radiofrequency mass filter, such as $^{235}UF_6^-$ ions, pass through the filter into a collection chamber where the ionized molecules are first neutralized by hitting a plate which has been grounded, and then condensed on a cold baffle such as a liquid-nitrogen-cooled trap. The $^{235}UF_6$ molecules can then be easily recovered for further processing.

Referring now to the single drawing, the apparatus of the invention consists generally of four stages or chambers placed end to end and having a common wall between adjacent chambers. In the first stage, the prepared feed gas mixture is passed, under pressure, through line 10 while being maintained at about 100° C. by heater 11, to expansion nozzle 16 located in exhaust chamber 12 and directed at aperture 18 in the apex of a hollow conical-shaped skimmer 26 attached to common wall 20. Nozzle 16 contains an internal cartridge heater 22 which heats the feed gas mixture to about 600° C. before the gas is released from nozzle 16 and expands into chamber 12. The central portion of the expanded feed gas passes through aperture 18 in skimmer 26 and into the second stage to form a jet of $UF_6$ molecules, $UF_6$ and heat transfer molecular clusters and propellant gas molecules. The remainder of the expanded feed gas passes along the outside of skimmer 26 and is pumped from chamber 12 through return line 28 by mechanical pump 30, passing through liquid-nitrogen-cooled trap 32 where the $UF_6$ and heat transfer gas are separated from the propellant gas. The propellant gas is then collected and recompressed to be used again along with the trapped $UF_6$ and heat transfer gas to prepare additional feed gas mixture.

In the second stage, the gas jet passes through irradiation chamber 34 where it may be subjected to irradiation from source 35 to vaporize any $UF_6$ molecular clusters present in the jet, so that the jet contains only mono-molecular $UF_6$ species before it passes into elongated quadrupole chamber 40 through aperture 42 in wall 44. A reduced pressure is maintained in chamber 34 by vacuum pump 36 connected by vacuum line 38.

In the third stage, extending the length of the interior of chamber 40 is quadrupole mass filter 46, while outward of mass filter 46 are liquid-nitrogen-cooled baffles 48. Penetrating filter 46 near wall 44 and extending in a downward direction is nozzle 50 for directing a jet of electron donor atoms at right angles across the gas jet to ionize the $UF_6$ molecules and toward atom trap 52 for collecting unreacted donor atoms. Vacuum pump 54 connected by line 56 with chamber 40 maintains the vacuum therein. As the $UF_6$ ions pass through the mass filter 46, $^{238}UF_6^-$ ions ejected out the sides of the mass filter onto some of the baffles 48 where they are collected, while the unejected $^{235}UF_6^-$ ions continue along the axis of chamber 40, through aperture 52 in common wall 60 into the stage 4 collection chamber 62, where a low pressure is maintained by diffusion pump 65 through line 64. The ions are deflected to a grounding plate 70 where the charge is neutralized, and collected on cold trap 72, from which the $^{235}UF_6$ molecules can be easily recovered for further processing or for dilution with $^{238}UF_6$ to provide the desired enrichment.

It is believed that a single beam prototype separator of the type described using the process of the invention will be able to attain an output of about 40 mg of nearly 100% enriched $^{235}U$ per hour. The separation will produce in a single pass 3 to 100% $^{235}U$ with a throughput of up to 25 or up to about 50% (depending upon the length of the quadrupole) with very little $^{235}U$ in the tailings. An advantage of the method and apparatus of this invention is that, by adjusting the resolution of the quadrupole mass filter, any enrichment desired from about 3 to 100% in $^{235}U$ can be provided in a single pass through the apparatus. Because of this single pass-through feature, scale-up to commercial isotope separation requires only that a multiplicity of similar apparatus be assembled, requiring no scaling up in size.

The following example is presented to illustrate the process and is not to be taken as limiting the scope of the invention as defined in the appended claims.

EXAMPLE

A feed gas mixture is prepared by forcing helium propellant at about 25 atmospheres pressure through small holes in a nickel tube immersed in liquid uranium hexafluoride at about 100° C. The pressure of the helium, its flow rate and the temperature of the liquid uranium hexafluoride are adjusted so that the carrier gas downstream contains approximately 5% $UF_6$. $SF_6$ is introduced into the feed through a leak valve so that the feed gas mixture contains a few percent of $SF_6$. The mixture is maintained at about 100° C. and is directed through a nickel expansion nozzle where it is further heated to 600° C. The gas mixture at 10–20 atmospheres pressure and at 600° C. expands as a supersonic jet from a 0.25 mm diameter aperture in the exhaust end of the nozzle. Velocity equilibration between the $UF_6$ molecules and the propellant gas results in the $UF_6$ attaining a translational energy of about 3 eV. The core of the expanded jet passes through a 1.0 mm aperture in the apex of a conical skimmer into a second differentially pumped chamber. The remainder of the jet, which is about 99% of the gas leaving the nozzle, becomes ambient gas at a steady state pressure of 0.1 to 1.0 Torr in the exhaust chamber. The gas is pumped from this chamber through a cold trap where the $UF_6$ and $SF_6$ are removed. The propellant gas is collected, compressed and recycled with the $UF_6$ and $SF_6$ to prepare additional feed gas.

The core of the gas jet in the second chamber now contains about 50% $UF_6$, most of which is in the form of solid clusters containing up to $10^4$ molecules. The jet is now irradiated by a 10 watt $CO_2$ laser which excites the $SF_6$ molecules. Vibrational-rotational relaxation of the excited $SF_6$ followed by rapid heat transfer evaporates the clusters to form a jet containing monomolecular $UF_6$ species.

The gas jet is then passed through an aperture into the quadrupole chamber, where it passes through about a 2 cm long cross jet of cesium atoms having a density of about $10^{13}$–$10^{14}$ atoms $cm^{-3}$. As the $UF_6$ molecules pass through this jet, they are converted to $UF_6^-$ negative ions by electron transfer from the cesium atoms. The gas jet now containing 90% $UF_6^-$ ions passes through a radiofrequency mass filter which is operated in the ion-ejection mode. The filter has a frequency of about 0.68 MHZ at a peak voltage of 27.2 KV. An auxiliary rf field of 0.0840 MHZ at a peak voltage of 33.3 V causes the $^{238}UF_6^-$ ions to be ejected out the sides of the quadrupole and collected on liquid-nitrogen-cooled baffles; excess cesium ions will also be ejected and collected. The $^{235}UF_6^-$ ions pass through the filter into the collection chamber where they are neutralized and collected in a liquid-nitrogen-cooled cylindrical trap from which they are recovered and separated. After operation of this method for one hour, about 40 mg of essentially pure $^{235}UF_6$ is collected in the cylindrical trap.

It can be seen from the foregoing discussion that the novel method and apparatus of this invention provide an effective and reasonably economical means for the separation of isotopes and especially for the separation of $^{235}U$ from natural uranium or other sources of the isotope.

The embodiments of the invention in which an exclusive property or privilege is claimed are defined as follows:

1. A method for separating a specific isotope from a mixture of isotopes of an actinide element present as $MF_6$, wherein M is the actinide element, comprising:
    a. preparing a feed gas mixture of about 1 to about 10 mole percent $MF_6$ in a propellant gas selected from the group consisting of hydrogen and helium;
    b. passing the feed gas mixture under pressure through an expansion nozzle while heating the mixture to about 600° C.;
    c. releasing the heated gas mixture from the nozzle into an exhaust chamber having a reduced pressure, whereby a gas jet of $MF_6$ molecules, $MF_6$ molecular clusters and propellant gas molecules is formed, said $MF_6$ molecules having a translational energy of about 3 ev;[6]
    d. converting the $MF_6$ molecules to $MF_6$ ions by passing the jet through a cross jet of electron donor atoms so that an electron transfer takes place between the $MF_6$ molecules and the electron donor atoms whereby the jet is now quasi-neutral, containing negative $MF_6^-$ ions and positive donor ions;
    e. passing the quasi-neutral jet through a radiofrequency mass filter tuned to separate the $MF_6^-$ ions containing the specific isotope from the $MF_6^-$ ions of the other isotopes present in the mixture; and
    f. neutralizing and collecting the $MF_6$ molecules of the specific isotope.

2. The method of claim 1 wherein M is selected from the group consisting of uranium and plutonium.

3. The method of claim 2 wherein the feed gas mixture is at a pressure of from 1 to 25 atmospheres as it passes to the nozzle.

4. The method of claim 3 wherein the electron donor atoms are selected from the group consisting of Cs, Na, K, Ba, Tl and Bi.

5. The method of claim 4 wherein the feed gas mixture is helium containing about 4 to 6 mole percent $MF_6$.

6. The method of claim 5 wherein the feed gas mixture contains about ½ to 5 mole percent of a heat transfer gas capable of absorbing radiation and including the additional step of irradiating the gas jet with said radiation to excite the heat transfer gas molecules which then heat the clusters of $MF_6$ molecules to vaporize the clusters to mono-molecules whereby the jet contains essentially mono-molecular $MF_6$ species.

7. The method of claim 6 wherein the heat transfer gas is selected from the group consisting of $SF_6$ and HF.

8. The method of claim 7 wherein the feed gas mixture contains ½ to 5 mole percent $SF_6$ and the gas jet is irradiated with a $CO_2$ laser having a frequency of about 10.6 microns.

9. The method of claim 7 wherein the feed gas mixture contains ½ to 5 mole percent HF and the gas jet is irradiated by passing the jet through a microwave field having an electric field strength of at least 10 kV/cm.

10. The method of claim 7 wherein the feed gas mixture contains ½ to 5 mole percent HF and the gas jet is irradiated with a hydrogen fluoride laser emitting radiation near 2 microns.

* * * * *